United States Patent
Koppich

(10) Patent No.: US 7,312,903 B2
(45) Date of Patent: Dec. 25, 2007

(54) SCAN JOB SIZE

(75) Inventor: George Koppich, Palos Verdes Est., CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 982 days.

(21) Appl. No.: 10/403,908

(22) Filed: Mar. 31, 2003

(65) Prior Publication Data

US 2004/0190079 A1    Sep. 30, 2004

(51) Int. Cl.
 *H04N 1/04* (2006.01)
(52) U.S. Cl. .............. 358/474; 358/401; 358/403; 358/501; 358/505; 382/305; 382/306; 271/3.04; 271/3.06; 271/3.09; 271/3.15; 271/3.17; 355/407; 355/408
(58) Field of Classification Search ........ 358/296, 358/474, 1.13–1.18, 537, 401, 403, 501, 358/505; 382/305, 306; 271/3.04, 3.06, 271/3.09; 355/407, 408
See application file for complete search history.

(56) References Cited

U.S. PATENT DOCUMENTS

| | | | |
|---|---|---|---|
| 4,581,656 A | 4/1986 | Wada | |
| 4,670,791 A | 6/1987 | Murata et al. | |
| 5,168,371 A * | 12/1992 | Takayanagi | 358/296 |
| 5,227,894 A | 7/1993 | Yoshida | |
| 5,291,592 A | 3/1994 | Kita | |
| 5,563,966 A | 10/1996 | Ise et al. | |
| 5,764,375 A | 6/1998 | Park | |
| 5,801,837 A | 9/1998 | Hamanaka et al. | |
| 5,875,038 A | 2/1999 | Gerber | |
| 5,940,543 A | 8/1999 | Isemura et al. | |
| 6,016,387 A | 1/2000 | Yoshida | |
| 6,118,544 A | 9/2000 | Rao | |
| 6,208,436 B1 | 3/2001 | Cunningham | |
| 6,466,336 B1 | 10/2002 | Sturgeon et al. | |
| 2004/0150853 A1* | 8/2004 | Stodersching et al. | 358/1.13 |

FOREIGN PATENT DOCUMENTS

| | | |
|---|---|---|
| EP | 596.724 | 5/1994 |
| EP | 940.970 | 9/1999 |
| JP | 57.148.459 | 9/1982 |
| JP | 3.077.175 | 4/1991 |
| JP | 4.079.471 | 3/1992 |
| JP | 4.265.058 | 9/1992 |
| JP | 5.035.839 | 2/1993 |
| JP | 9.062.453 | 3/1997 |
| JP | 2001350227 A * | 12/2001 |
| JP | 314.796 | 10/2002 |

OTHER PUBLICATIONS

Printouts from the Web: http://www.msfw.net; http//www.datastorbend.com/kodak/muscaptures.htm.

* cited by examiner

*Primary Examiner*—Twyler Lamb
*Assistant Examiner*—Michael Burleson
(74) *Attorney, Agent, or Firm*—Tucker Ellis & West LLP

(57) ABSTRACT

This invention is directed to a system and method for generating an image of a plurality of documents. More particularly, this invention is directed to a system and method for scanning a plurality of documents wherein the scanned pages are separated into distinct documents based on a pre-set page length.

16 Claims, 4 Drawing Sheets

SCAN JOB SIZE

BACKGROUND OF THE INVENTION

This invention is directed to a system and method for generating an image of a plurality of documents. More particularly, this invention is directed to a system and method for scanning a plurality of documents wherein a user pre-sets the length of a document at the scanner.

Often with conventional scanners, such as those onboard of a Multi-Function Peripheral (MFP), or any scanner in general, it is desirable to scan a plurality of documents to an electronic format, such as a TIFF format. This is typically done by utilizing page separators and/or markers between each document. However, this is a time consuming method which can cause various errors in the number of pages scanned. For example, page separators/markers typically contain other coded identifier information, such as user login information, user name, image information, etc. All of this other coded identifier information must be read first before the page separator is detected. Therefore, the processing time for scanning the document becomes long.

Additionally, difficulties are encountered in scanning multiple documents, since each separate document must be manually entered into the scanner. Typically, a user must wait for the first document to be scanned before entering the second document. Thus, valuable time is lost when many large documents are to be scanned at once.

Thus, there is a need for a system and method of scanning a plurality of documents which overcomes the limitations of the prior art, and allows a user to pre-set the length of a document at the scanner.

SUMMARY OF THE INVENTION

In accordance with the present invention, there is provided a system and method for scanning a plurality of documents.

In accordance with the present invention, there is provided a system and method for scanning a plurality of documents wherein a user pre-sets the length of the documents at the scanner.

Further, in accordance with the present invention, there is provided a system and method for scanning a plurality of documents wherein the scanned pages are separated into distinct documents based on the pre-set page length.

Still further in accordance with the present invention, there is provided an image generating system wherein the system comprises means adapted for acquiring document image data representative of a document, a memory for storing the document image data, and means adapted to establish a page length of a specific set of documents, wherein each document contains the same number of pages. The system further comprises an inputting means adapted to pre-set the page length for the specific set of documents, means adapted to collect and stack all documents with the specified number of pages, and an image generating means adapted to generate in the memory image data of the stack of collected documents, and to separate the image data into distinct documents based on the pre-set page length.

Still further in accordance with the present invention, there is provided a method for generating images. The method comprising the steps of acquiring image data representative of a document and storing the document image data in memory. A page length of a specific set of documents is established and input into an image generating apparatus as a pre-set value. All documents with the specified number of pages are collected and stacked. Image data of the stack of collected documents is generated and then separated into distinct documents based on the pre-set page length.

These and other advantages, aspects, and features will be understood by one of ordinary skill in the art upon reading and understanding the specification.

DETAILED DESCRIPTION OF INVENTION

Figure 1:
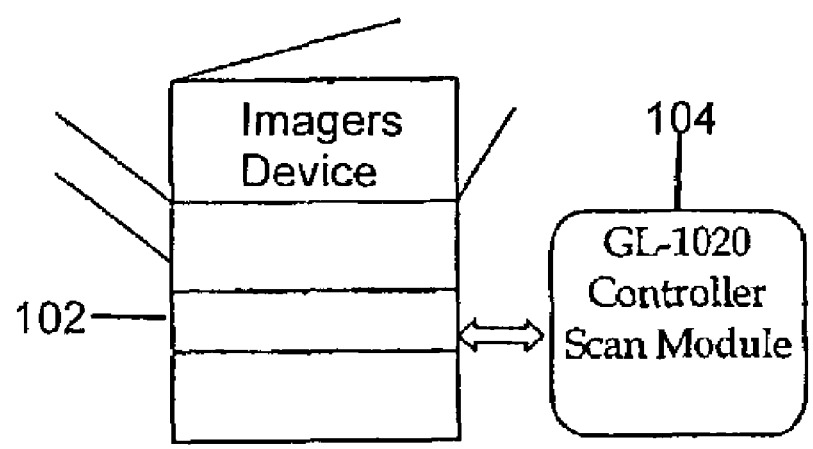
FIG. 1 is a block diagram illustrating the preferred embodiment of the system according to the present invention.

The present invention is directed to a system and method for generating images. FIG. 1 shows a block diagram preferred embodiment of the system according to the present invention generally designated 100. The system comprises an image generating device 102, such as a scanner or copier, for generating image data. The image generating device is any suitable image generating device known in the art. Preferably, the image generating device is a scanning device or a copying device. More preferably, the image generating device is a scanning device. The image generating device further comprises a controller 104 which controls the functions of the image generating device and includes storage means for storing the image data.

Figure 2:
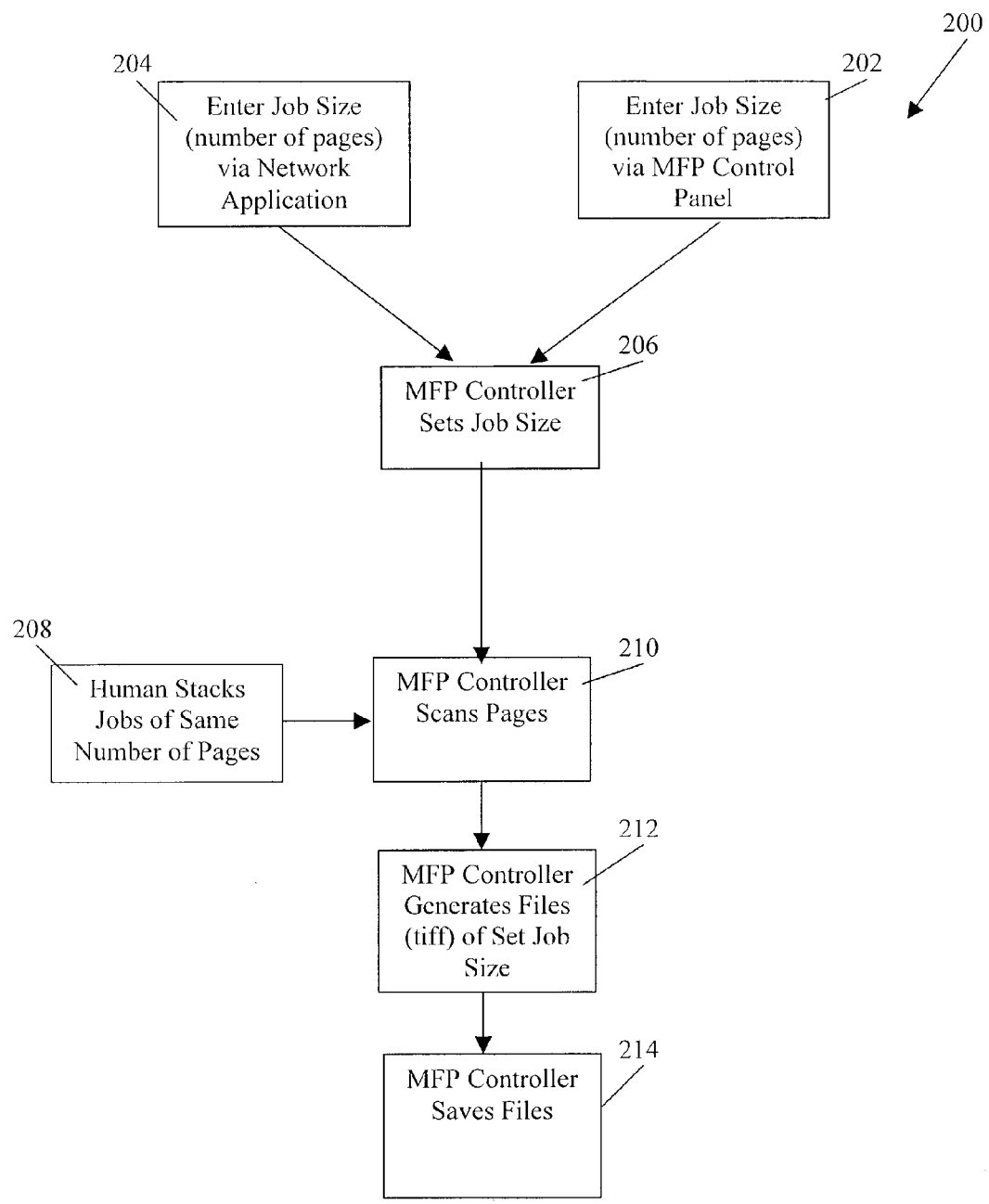
FIG. 2 is a block diagram illustrating the preferred embodiment of the method according to the present invention.

In operation the system 200, as shown in FIG. 2, separates the image data into distinct documents based on a pre-set page length. A user establishes a specific page length of a set of documents to be scanned, then inputs the specific page length or job size into the controller 104. The job size can be inputted into the controller by any suitable means. For example, a user can manually set the page length by typing it in the control panel 202 via a keyboard or input the page length into the controller via a network application or web browser 204. The controller then sets the job size 206 to the specific page length recorded.

A user collects and stacks together 208 all documents containing the specified number of pages, as recorded in the controller. The number of documents collected is inconsequential, as long as each document collected has the same number of pages as the job size recorded in the controller. A plurality of documents is inputted into the controller. The controller then generates an image of each page 210 of all the documents and keeps track of the current page count.

Figure 3:
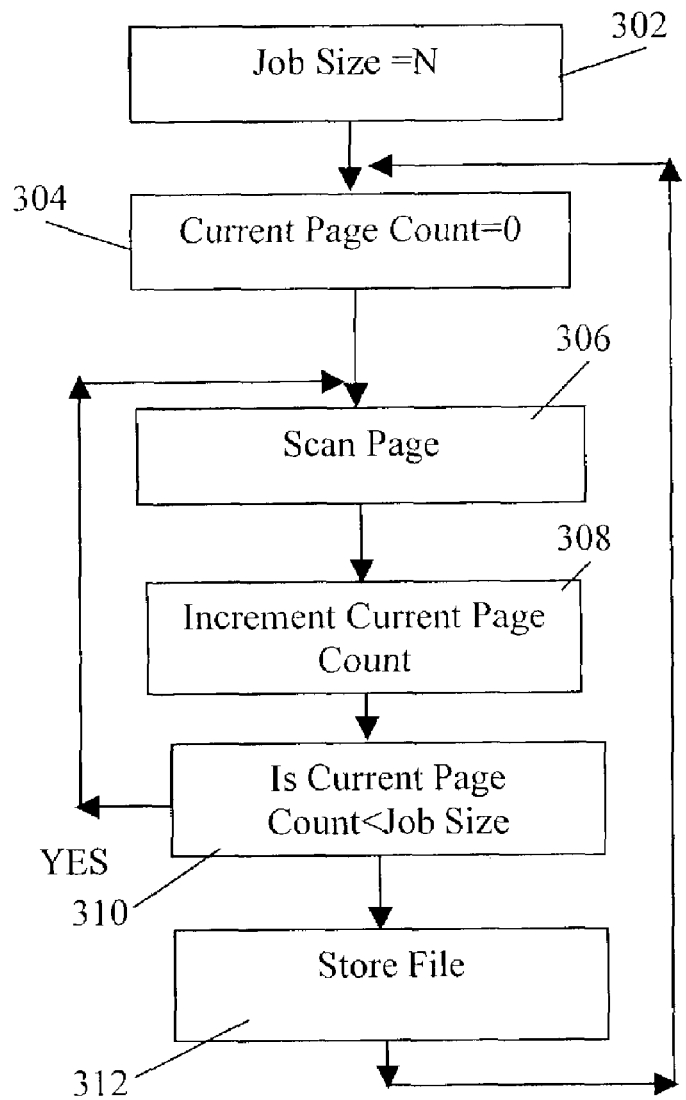
FIG. 3 is a block diagram illustrating the components of the present invention.

FIG. 3 further expounds the controller's image generating process. Specifically, the controller first sets the job size 302 and the current page count 304. The controller then generates an image of a document page 306 and increments the current page count 308 accordingly. The controller then determines if the current page count is less than the job size 310. If the current page count is less than the job size, the controller will generate an image of another document page 306 and update the page count 308. The controller will continue to generate an image of additional document pages until the current page count is equal to the job size. When this occurs, the controller will store the document as an electronic file 312.

Referring back to FIG. 2, once the controller generates an electronic file of the image data, corresponding to the set job size 212; the electronic file is then saved in the controller's memory 214. The controller can generate any suitable electronic file of the document. Preferably, the controller generates the image data into a TIFF file.

Figure 4:
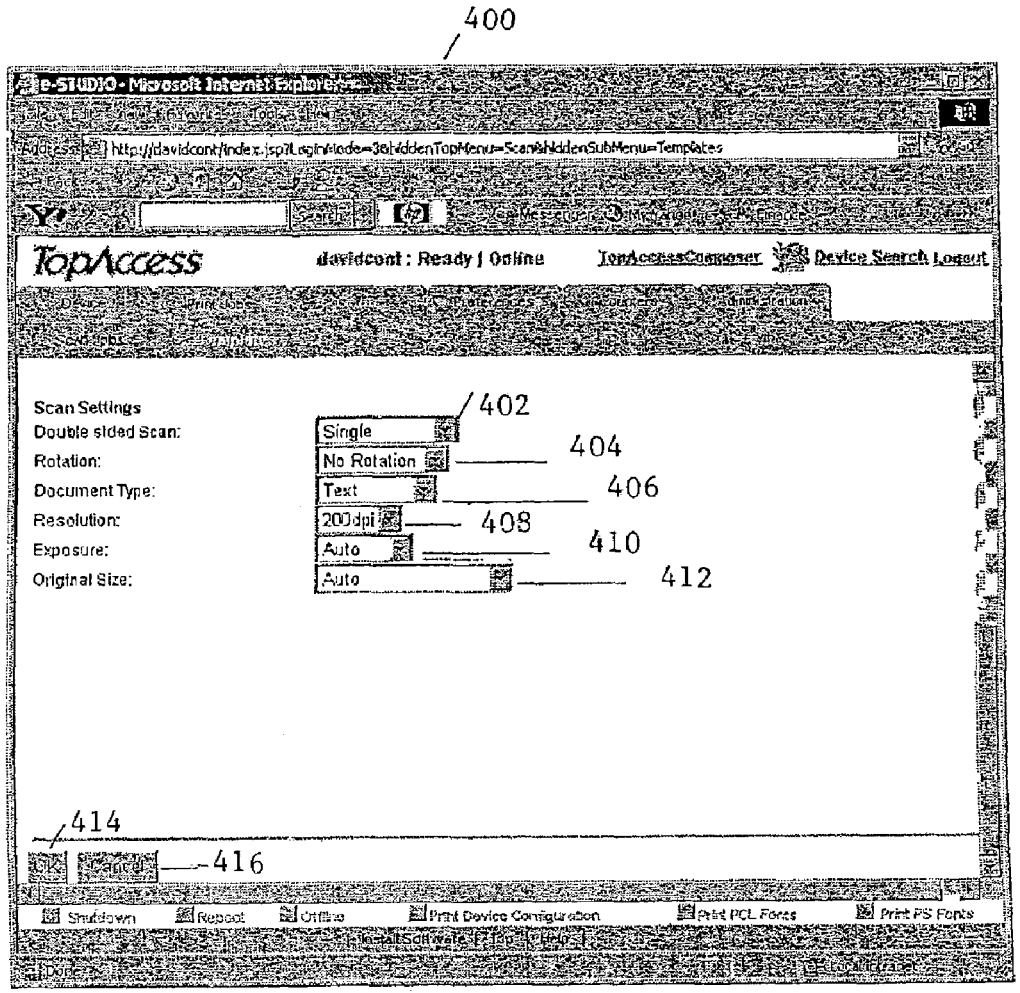
FIG. 4 shows a sample template for selecting the desired parameters for generating the image data of the present invention.

A user can also select the desired parameters for generating the image data. These parameters can be selected by any suitable means. FIG. 4 shows a preferred sample screen display 400 for selecting the desired settings for generating the image data. The user selects whether it is a double-sided scan image at 402. The user then specifies the rotation at 404, the document type at 406, the resolution at 408, the exposure at 410, and the size of the original at 412. The user can then select the OK button 414 to save the settings or the Cancel button 416 to cancel the settings entered.

Once the desired parameters are set, the scanned pages are separated into distinct documents based on the pre-set page length and stored in memory. Additionally, if a user intends to generate images of documents of a different length, the user inputs a new page length or job size into the controller. The user then stacks and generates images of all documents having the new page length.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by the those skilled in the area within the principle and scope of the invention as will be expressed in the appended claims.

What is claimed is:

1. An image generating system comprising:
   means adapted for acquiring document image data representative of a document;
   a memory for storing the document image data;
   means adapted to establish a page length corresponding to a number of pages associated with each document of a specific set of documents, wherein each document contains the same number of pages;
   an inputting means adapted to store page data representative of a pre-set number of pages shared in common by each document of the specific set of documents; and
   an image generating means adapted to generate, in the memory, image data of each document of the set of documents; and
   means adapted for generating separator data so as to identify the image data into distinct portions based on stored page data.

2. The image generating system of claim 1 wherein the inputting means includes means adapted for manually inputting the pre-set page length including at least one of a keyboard, a user interface on the image generating device, and via a network application or web browser.

3. The image generating system of claim 1 further comprising means adapted to collect and stack the set of documents with the specified number of pages.

4. The image generating system of claim 1 further comprising means adapted for selecting the desired parameters for generating the image data.

5. The image generating system of claim 4 further comprising a display for generating an image of the document image data.

6. The image generating system of claim 1 wherein the image generating means includes optical character recognition systems, image generating devices, and other multifunction peripherals.

7. The image generating system of claim 1 wherein the image generating means generates the set of documents into TIFF files.

8. The image generating system of claim 1 further comprising:
   means adapted to change the pre-set page length for each document to a new established page length; and
   means adapted to generate separator data so as to identify the image data into distinct portions having the new pre-set page length.

9. A method for generating images comprising the steps of:
   acquiring image data representative of a document;
   storing the document image data in memory;
   establishing a page length corresponding to a number of pages associated with each document of a specific set of documents, wherein each document contains the same number of pages;
   inputting the page length for each document of the specific set of documents into an image generating apparatus as a pre-set value;
   generating, in the memory, image data of each document of the set of documents; and
   generating separator data so as to identify the image data into distinct portions based on the pre-set page length.

10. The method of claim 9 wherein the page length of the specific set of documents is manually input into the image generating apparatus via a keyboard, a user interface on the image generating device, and via a network application or web browser.

11. The method of claim 9 further comprising collecting and stacking the set of documents with the specified number of pages.

12. The method of claim 9 further comprising selecting the desired parameters for generating the image data.

13. The method of claim 12 further comprising a display for generating an image of the document image data.

14. The method of claim 9 wherein the image generating apparatus includes optical character recognition systems, image generating devices, and other multifunction peripherals.

15. The method of claim 9 wherein the image generating apparatus generates the set of documents into TIFF files.

16. The method of claim 9 further comprising:
   changing the pre-set page length for each document to a new established page length; and
   generating separator data as to identify the image data into distinct portions based on the new pre-set page length.

* * * * *